United States Patent
Shumaker

(10) Patent No.: US 10,609,874 B1
(45) Date of Patent: Apr. 7, 2020

(54) UTILITY VEHICLE MOUNTING ACCESSORY FOR LANDSCAPING BLOWER

(71) Applicant: Umount Holdings, LLC, Holland, MI (US)

(72) Inventor: Kristopher D. Shumaker, Holland, MI (US)

(73) Assignee: Umount Holdings, LLC, Holland, MI (US)

( * ) Notice: Subject to any disclaimer, the term of this patent is extended or adjusted under 35 U.S.C. 154(b) by 123 days.

(21) Appl. No.: 15/611,222

(22) Filed: Jun. 1, 2017

(51) Int. Cl.
| | |
|---|---|
| A01G 20/43 | (2018.01) |
| B60R 11/06 | (2006.01) |
| B62D 65/16 | (2006.01) |
| B60R 11/00 | (2006.01) |
| B62B 1/06 | (2006.01) |
| A01G 20/47 | (2018.01) |

(52) U.S. Cl.
CPC .............. *A01G 20/43* (2018.02); *B60R 11/06* (2013.01); *B62D 65/16* (2013.01); *A01G 20/47* (2018.02); *B60R 2011/004* (2013.01); *B62B 1/06* (2013.01); *B62B 2202/50* (2013.01)

(58) Field of Classification Search
CPC ................................ A01G 20/43; A01G 20/47
See application file for complete search history.

(56) References Cited

U.S. PATENT DOCUMENTS

| | | | |
|---|---|---|---|
| 5,722,110 A * | 3/1998 | McIntyre | A47L 5/14 15/329 |
| 7,240,891 B2 | 7/2007 | Hafendorfer | |
| 7,603,738 B1 | 10/2009 | Woodcock et al. | |
| 2005/0205750 A1* | 9/2005 | Hafendorfer | F16M 13/02 248/637 |
| 2007/0214600 A1* | 9/2007 | Block | A47L 5/14 15/405 |
| 2016/0108924 A1* | 4/2016 | Conrad | F04D 25/0673 417/423.7 |

* cited by examiner

*Primary Examiner* — Andrew A Horton
(74) *Attorney, Agent, or Firm* — Frank M. Scutch, III

(57) ABSTRACT

A landscaping blower mounting accessory for use with a utility vehicle includes a blade connecter mounted to the utility vehicle. A receiving coupler is attached to the landscaping blower and shaped to receive the blade. A landscaping blower is oriented so that a housing covering a blower impeller is positioned between the utility vehicle and the blower motor. The mounting assembly allows the blade to frictionally engage within the coupler for holding the landscaping blower in a fixed position above the ground on the front of the utility vehicle.

16 Claims, 5 Drawing Sheets

UTILITY VEHICLE MOUNTING ACCESSORY FOR LANDSCAPING BLOWER

CROSS-REFERENCE TO RELATED APPLICATIONS

This application is related to U.S. application Ser. No. 14/920,461 entitled Landscaping Blower Nozzle Assembly filed on Oct. 22, 2015, now U.S. Pat. No. 9,520,516 and Application Ser. No. 15/341,863, now U.S. Pat. No. 10,343,618 entitled Landscaping Blower Nozzle Assembly filed on Nov. 2, 2016, which are both incorporated by reference in their entireties.

FIELD OF THE INVENTION

The present invention relates generally to landscaping blowers and more particularly to a mounting accessory for attaching a landscaping blower to a utility vehicle.

BACKGROUND

Commercial landscaping blowers are well known and come in various shapes, sizes and configurations. Walk behind blowers are powerful and easy to use in hilly terrain or large open areas. However, the walk behind blower does not offer air velocity sufficient to blow large quantities of leaves nor is it mountable. Further, because the walk behind blower can take a lot of time to blow small quantities of leaves or debris, it makes it tiresome to use often making it an impractical choice in many blowing situations.

Other blower arrangements include a pull behind blower that is typically supported using its own independent wheel and carriage assembly for separately supporting the blower apart from its mower or vehicle. Although this type of blower can deliver high volumes of air over a large area, this configuration makes maneuvering and transporting inconvenient. Forward speed and overall vehicle gas mileage are also reduced in view of the excessive drag introduced by the supporting carriage. While in use, the operator must look rearward making this style of blower inconvenient and too large for many blowing applicators. Still other blowers are self-propelled and use a stand-on arrangement where the operator stands on a platform and is pulled behind the blower while in motion.

Finally, there are power take-off (PTO) type blowers. The PTO blower is rear mounted to a vehicle which is typically behind a farm implement or tractor. The PTO blower uses the tractor's motor to partially provide drive power to a blower turbine motor. The PTO blower is heavy, rear mounted, cumbersome to use having no adjustment for vertically mounting the blower air exhaust above ground.

Those skilled in the art will recognize that the manner upon which the blower is mounted to the vehicle is important since it directly affects performance, efficiency and its ease of use. Prior art blowers require either its own supporting wheel(s), support carriage, external drive power while the blower nozzle's vertical height cannot be easily adjusted in relation to the ground.

BRIEF DESCRIPTION OF THE FIGURES

The accompanying figures, where like reference numerals refer to identical or functionally similar elements throughout the separate views and which together with the detailed description below are incorporated in and form part of the specification, serve to further illustrate various embodiments and to explain various principles and advantages all in accordance with the present invention.

DETAILED DESCRIPTION

Figure 1:
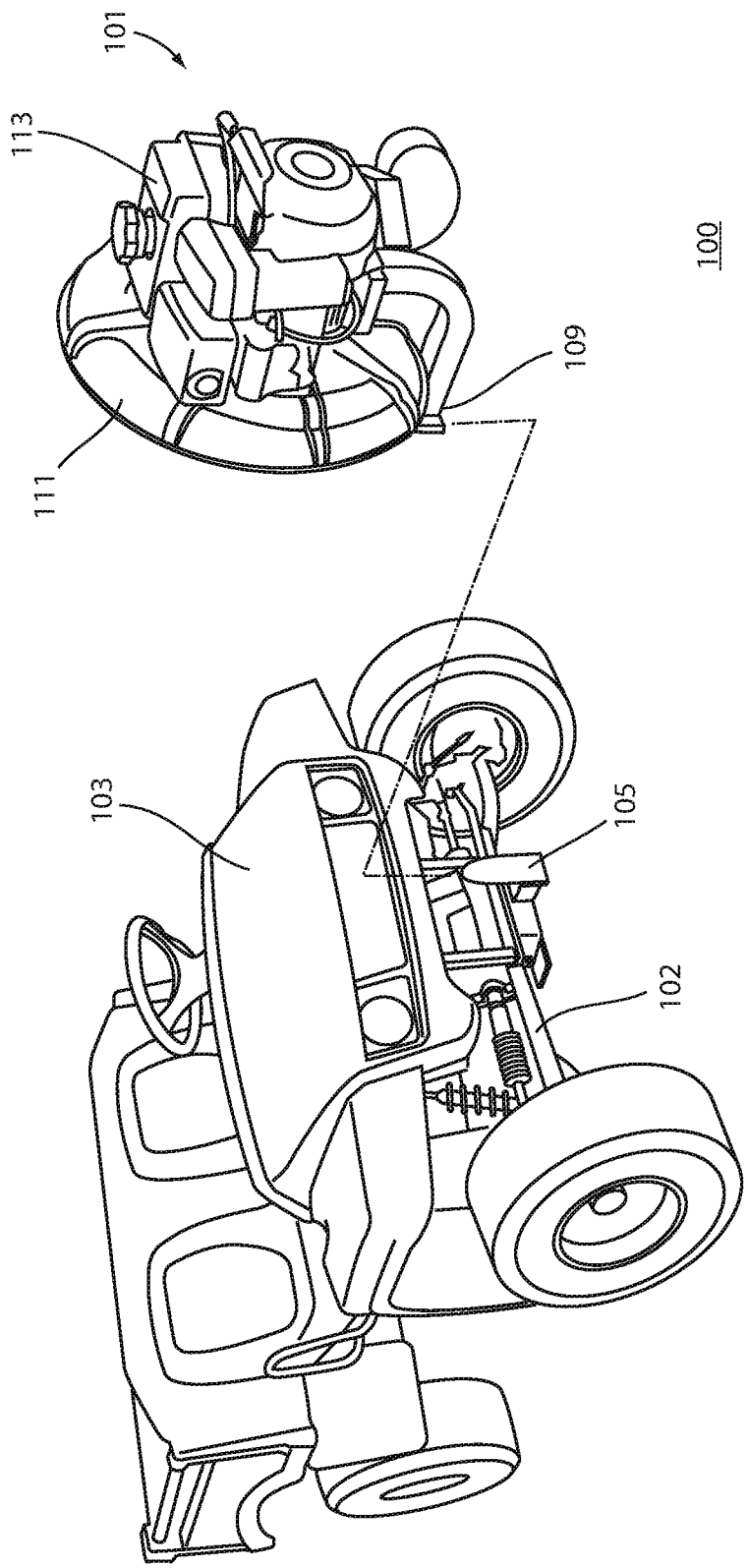
FIG. 1 is an exploded view illustrating the utility vehicle mounting assembly and how the blower mounts to the front of a utility vehicle.

Before describing in detail embodiments that are in accordance with the present invention, it should be observed that the embodiments reside primarily in combinations of method steps and apparatus components related a mounting system for a utility vehicle blower. Accordingly, the apparatus components and method steps have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

In this document, relational terms such as first and second, top and bottom, and the like may be used solely to distinguish one entity or action from another entity or action without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises . . . a" does not, without more constraints, preclude the existence of additional identical elements in the process, method, article, or apparatus that comprises the element.

Embodiment of the present invention describe a self-contained attachable blower system that utilizes a vehicle chassis for carrying and maneuvering towards areas of debris that an operator desires to clear away. FIG. 1 is an exploded view illustrating the utility vehicle mounting assembly and how the blower attaches to the front of a utility vehicle. The utility vehicle mounting assembly 100 is used to mount a landscaping blower 101 to a utility vehicle 103. Those skilled in the art will recognize that a utility vehicle is a vehicle, generally motorized, that is designed to carry out a specific task with more efficiency than a general-purpose vehicle. An example of such a utility vehicle is a Gator® vehicle manufactured by the John Deere Corporation. The mounting assembly 100 includes a blade 105 mounted to a front bumper or frame 107 of the vehicle 103. As will be described herein, the blade 105 provides a male attachment point for a receiver 109 attached to a side of the blower 101 so that the blower is mounted with the impeller air intake 111 facing the vehicle and the motor 113 facing outward from the vehicle. The motor 113 may be an electric, natural gas or petroleum powered motor.

Figure 2:
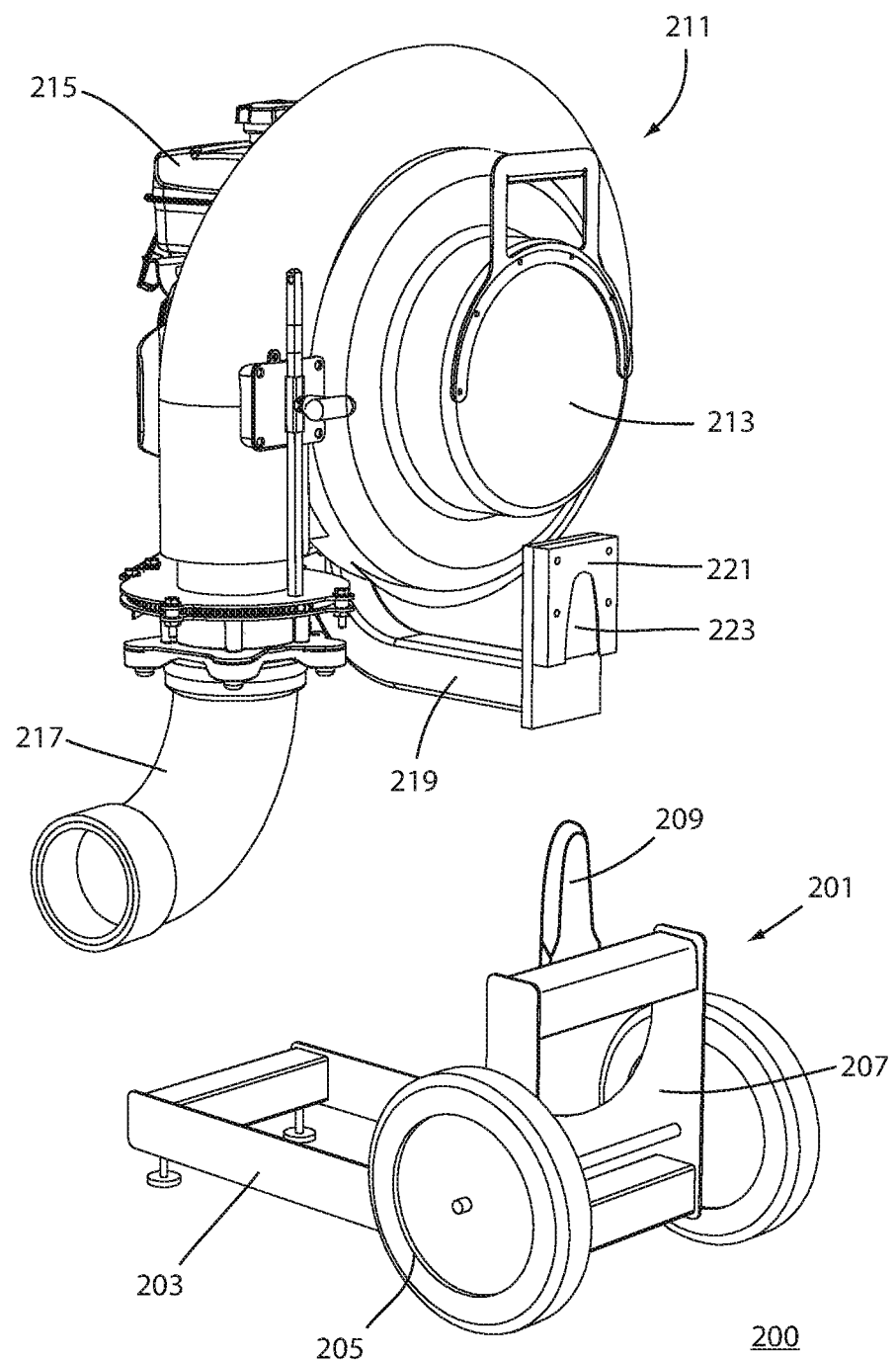
FIG. 2 is an exploded view illustrating a blower mounted to a utility cart. for easy transport.

FIG. 2 is an exploded view illustrating a blower mounted to a storage cart assembly for easy transport. The storage cart assembly 200 includes a storage cart 201 having a supporting frame 203. A plurality of wheels 203 are mounted to the frame 203 allowing the cart to be easily moved. A supporting plate 207 includes a vertical beveled blade 209 having a generally elongated u-shape that protrudes outwardly from the vehicle.

The landscaping blower 211 includes an impeller housing 213, motor 215 and rotatable nozzle 217. A support frame 219 extends under the impeller housing 213 and includes a receiver 221 at its end. The receiver 221 has a notch 223 configured substantially in the shape of the blade 223 so to receive the end of blade 209. In use, the blower 211 is positioned so the receiver 221 moves downwardly in a vertical manner over the blade 209 so the weight of the blower 211 will provide the necessary downward force to hold the receiver 221 on the blade 209 and into an immoveable positon. This cart 201 is used for transporting the blower 211 into a positon so it can be used with the utility vehicle as well as storing the blower when not mounted to the vehicle. In use, the cart 201 can be rolled into position and then lifted on the utility vehicle to transfer the weight of the blower. Those skilled in the art will recognize that other configuration of the blade are possible for example, a blade having a lower taper that increases in diameter or alternatively, a blade having one or more spring loaded finger(s) that can engage with one or more slots in the receiver.

Figure 3:
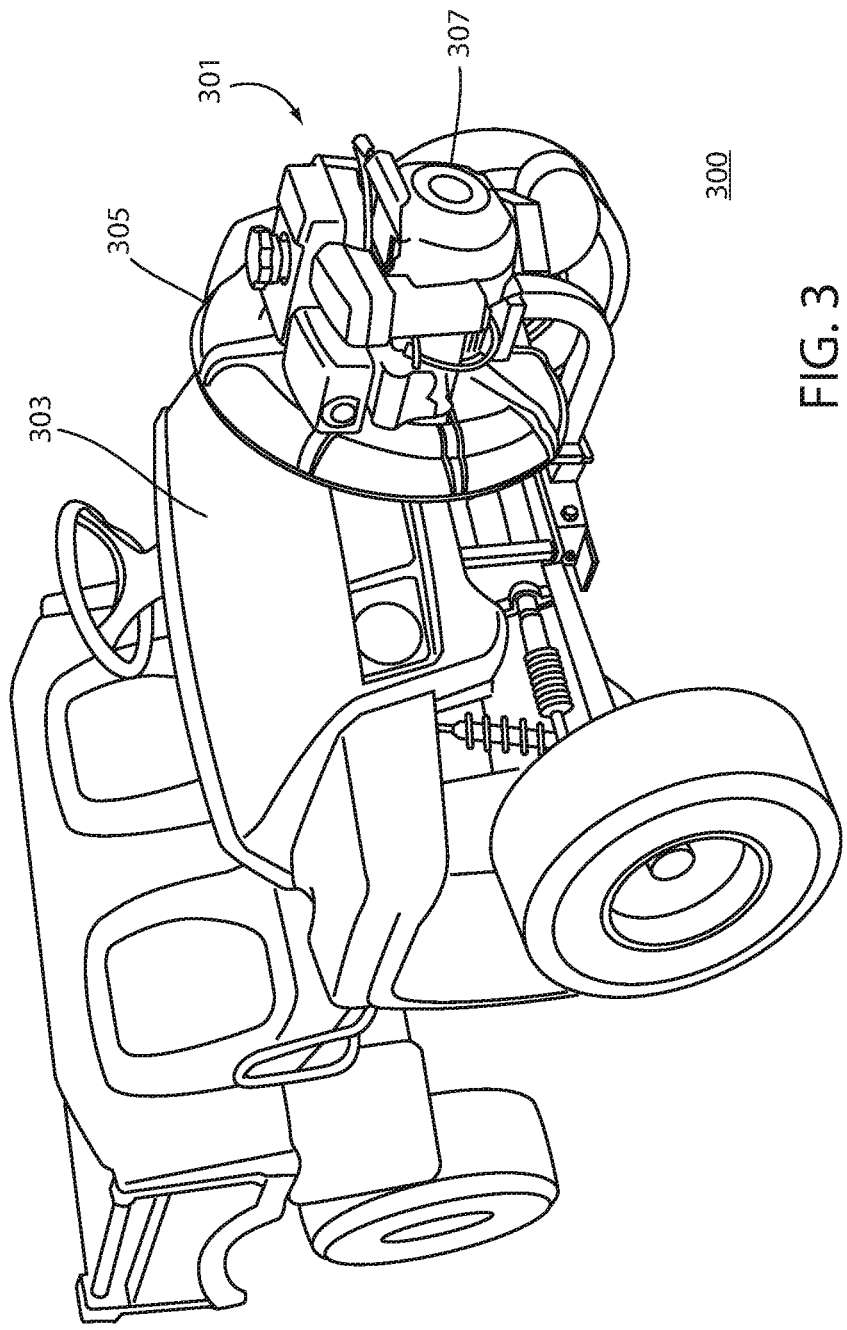
FIG. 3 a perspective view illustrating the blower mounted to the front of the utility vehicle such that the blower motor is outside of the housing.

FIG. 3 a perspective view illustrating the blower mounted to the front of the utility vehicle such that the blower motor is facing outside of the housing. The blower mounting assembly 300 includes the landscape blower 301 mounted to the front end of a utility vehicle 303. A unique embodiment of the invention is that the blower 301 is configured in a manner so that the impeller housing 305 is positioned between the front of the utility vehicle 303 and the blower motor 307. In other words, the blower motor 307 is configured so to be positioned forward and/or outwardly of the impeller housing 305. This allows the blower 301 to be attached to the vehicle so the blower exhaust is in close proximity to the front wheel axle. This configuration insures greater protection of the blower nozzle against impact during motion.

Those skilled in the art will recognize that not all utility vehicles use a single front axle but instead may use different forms of independent wheel suspension. No matter the type of wheel attachment, embodiments of the invention allow the landscape blower 301 to be mounted so that the blower's exhaust nozzle is substantially close to the front wheel and the ground. This allows the blower 301 and its blower nozzle to effectively blow substantially horizontally close to the ground, when in motion, so to be in unison with the vehicle chassis as well as with the terrain or other objects moving under the wheel. Because of this mounting configuration, no additional wheels or wheel carriage are needed to support the weight of the blower. This arrangement, where the motor is forward of the impeller housing, also works to prevent damage to the blower nozzle as it is not as likely to strike the ground when moving uphill or objects that move under the wheel. Moreover, this configuration also has the benefit of reducing engine noise because the blower motor is furthest away from the operator. This reduces fatigue when using such landscaping blowers over long periods of time.

Figure 4:
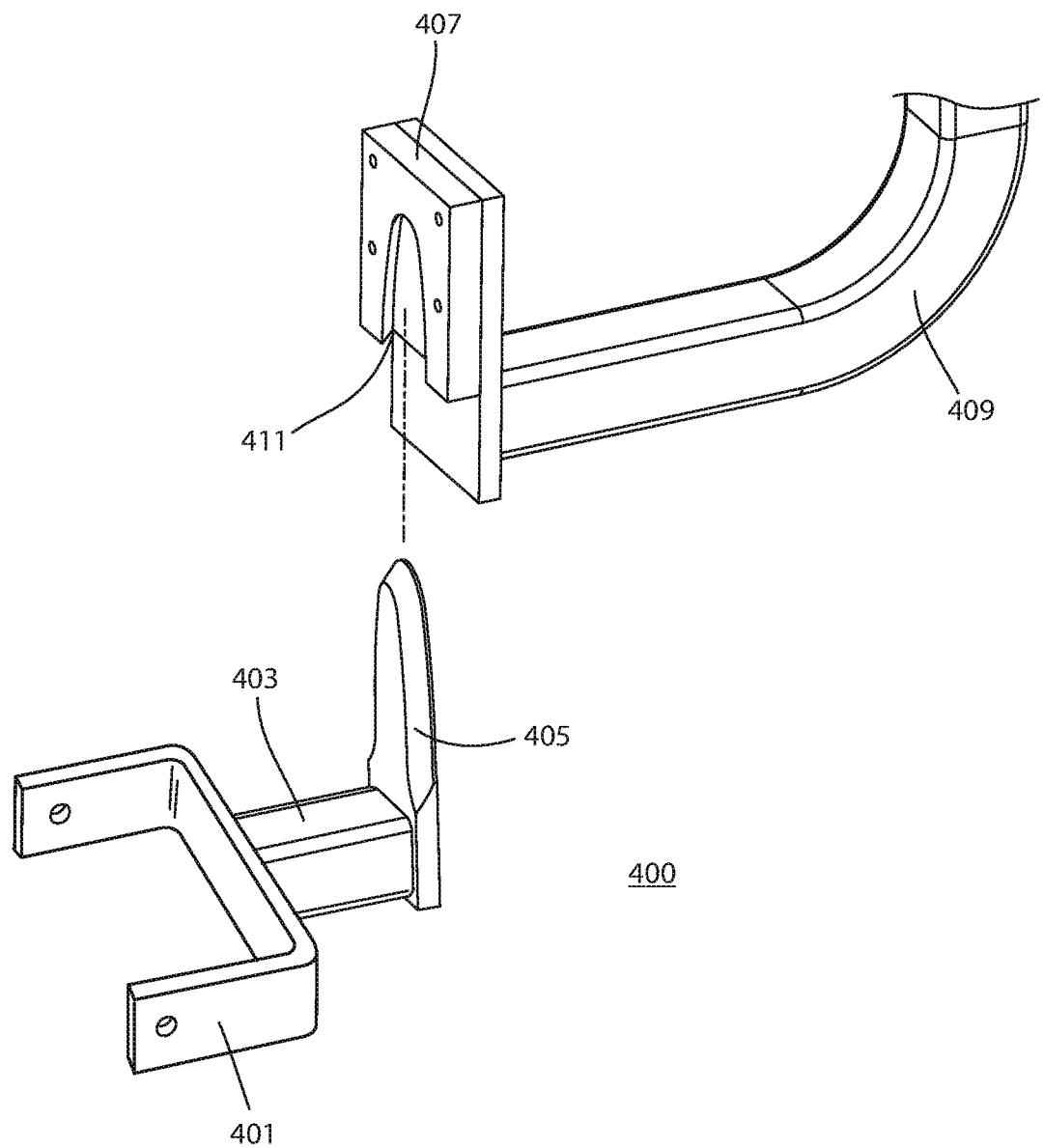
FIG. 4 is a perspective view illustrating how the mount blade mates with the receiver.

FIG. 4 is a perspective view illustrating how the mounting blade mates with the receiver. The mounting assembly 400 includes a C-shaped bracket 401 connected to arm 403. The arm 403 is attached to the blade 403 that extends substantially vertically and is configured in an elongated U-shape. As described herein, the blade 403 is used with a mounting plate 407 and receiver 411. The receiver 411 is in a dovetail-like shape and includes void configured with the mounting plate 407 that is substantially in the shape of the blade 403. The mounting plate 407 is attached to the blower using arm 409. In use, the blade 405 is frictionally engaged with the receiver 411 and is held into position by the weight of the blower so that the mounting assembly 400 holds the blower into a rigid and/or fixed positon.

Figure 5:
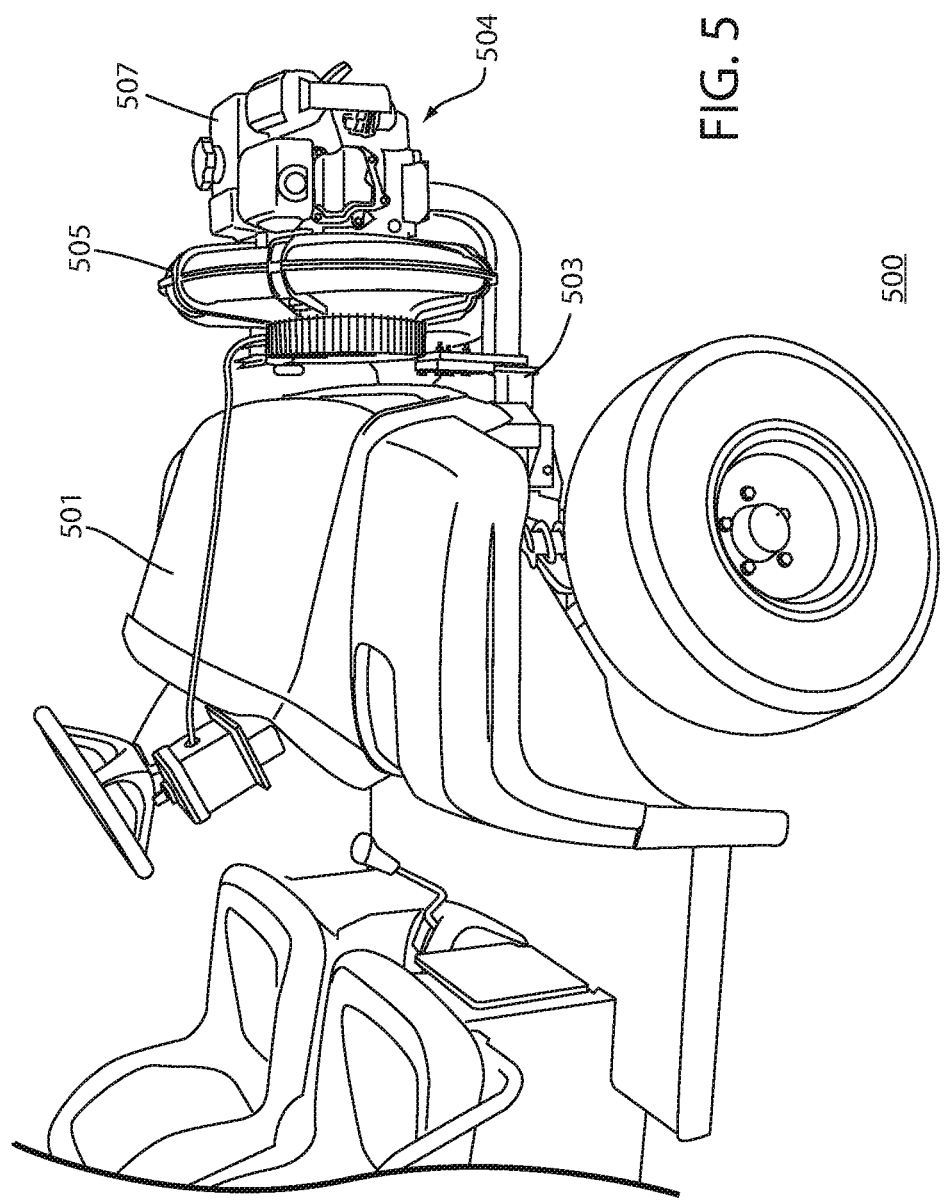
FIG. 5 is an elevated side view illustrating the blower mounted to the front of the utility vehicle.

FIG. 5 is an elevated side view illustrating the blower mounted to the front of the utility vehicle using the blower mounted assembly as described herein. The blower mounting assembly 500 includes the utility vehicle 501 showing the blade engaged within the receiver 503. This allows the blower 504 to be specifically configured so the impeller housing 505 is located between the utility vehicle 501 and the blower motor 507.

Hence, the present invention is directed to a landscaping blower mounting assembly that includes a landscaping blower having a motor and a shroud. A blade is attached to the front end of the utility vehicle and a receiver is attached to a landscaping blower for receiving the blade so to support the landscaping blower. The blower mounting assembly allows the landscaping blower to be configured so the impeller housing is positioned between the blade and the blower motor.

In the foregoing specification, specific embodiments of the present invention have been described. However, one of ordinary skill in the art appreciates that various modifications and changes can be made without departing from the scope of the present invention as set forth in the claims below. Accordingly, the specification and figures are to be regarded in an illustrative rather than a restrictive sense, and all such modifications are intended to be included within the scope of present invention. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

I claim:

1. A landscaping blower mounting assembly comprising:
   a landscaping blower having a motor and an impeller housing for use with a utility vehicle;
   a blade for attachment to the front end of the utility vehicle and mounted substantially centered between its front wheels;
   a receiver attached to the landscaping blower for receiving the blade so to support the landscaping blower; and
   wherein the landscaping blower is configured so the impeller housing is positioned between the blade and the blower motor.

2. A landscaping blower mounting accessory as in claim 1, wherein the landscaping blower is configured so a blower exhaust is positioned substantially near a front wheel of the utility vehicle.

3. A landscaping blower mounting accessory as in claim 1, wherein the blade is mounted on the front of the utility vehicle so it is substantially centered between the vehicle's front wheels.

4. A landscaping blower mounting accessory as in claim 1, wherein the landscaping blower is configured so landscaping blower air exits from a rotational nozzle.

5. A landscaping blower mounting accessory as in claim 1, wherein the receiver includes at least one bracket for mounting the receiver to the utility vehicle blower.

6. A landscaping blower mounting accessory as in claim 1, wherein the receiver includes a void configured substantially in the shape of the blade.

7. A landscaping blower mounting assembly for use with a utility vehicle comprising:
   a blade mounted to the utility vehicle and configured to be substantially centered between the front wheels of the utility vehicle;
   a receiver attached to the landscaping blower and shaped to receive the blade;
   a landscaping blower oriented so that a housing covering a blower impeller is positioned between the utility vehicle and a blower motor; and
   wherein the blade frictionally engages within the receiver for holding the landscaping blower in a fixed position above the ground on the front of the utility vehicle.

8. A landscaping blower mounting assembly as in claim 7, wherein the orientation of the blower allows a blower nozzle to be positioned close to a front wheel of the utility vehicle.

9. A landscaping blower mounting assembly as in claim 7, wherein the landscaping blower is configured so landscaping blower air exits from a moveable nozzle assembly.

10. A landscaping blower mounting assembly as in claim 9, wherein the nozzle assembly is rotatable.

11. A landscaping blower mounting assembly as in claim 7, wherein the receiver includes at least one bracket for mounting the blade to the landscaping blower.

12. A method for mounting a landscaping blower comprising the steps of:
   providing the landscaping blower having a motor and an impeller housing;
   mounting a blade so it is substantially centered between the front wheels of a utility vehicle;
   attaching a receiver to the landscaping blower for receiving the blade;
   orienting the landscaping blower so the impeller housing is positioned between the blade and the blower motor; and
   supporting the landscaping blower from the ground using the blade and receiver.

13. A method for mounting a landscaping blower as in claim 12, further comprising the step of:
   configuring the landscaping blower so a blower nozzle is substantially close to a front wheel of the utility vehicle.

14. A method for mounting a landscaping blower as in claim 12, further comprising the step of:
   configuring the landscaping blower so its exhaust is remotely moveable by an operator.

15. A method for mounting a landscaping blower as in claim 12, further comprising the step of:
   providing at least one bracket for mounting the blade to the utility vehicle blower.

16. A method for mounting a landscaping blower as in claim 12, further comprising the step of:
   configuring the receiver in substantially the shape of the blade.

* * * * *